May 14, 1968

F. E. STEBLEY 3,382,940

PERCUSSION DRILL BIT

Filed Oct. 21, 1965

INVENTOR
FRANK E. STEBLEY

BY John S. O'Brien

ATTORNEY

May 14, 1968  F. E. STEBLEY  3,382,940
PERCUSSION DRILL BIT

Filed Oct. 21, 1965  4 Sheets-Sheet 3

INVENTOR
FRANK E. STEBLEY
BY John S. O'Brien
ATTORNEY

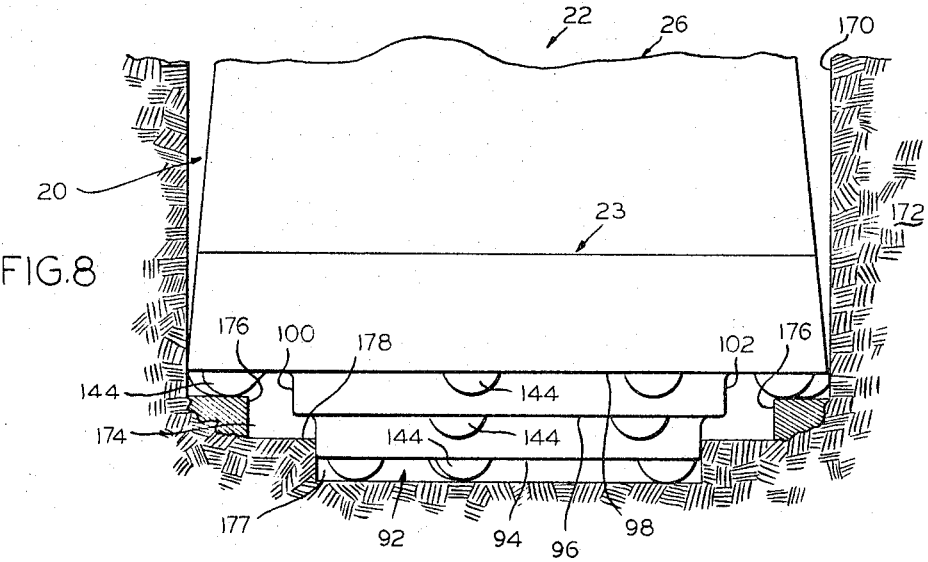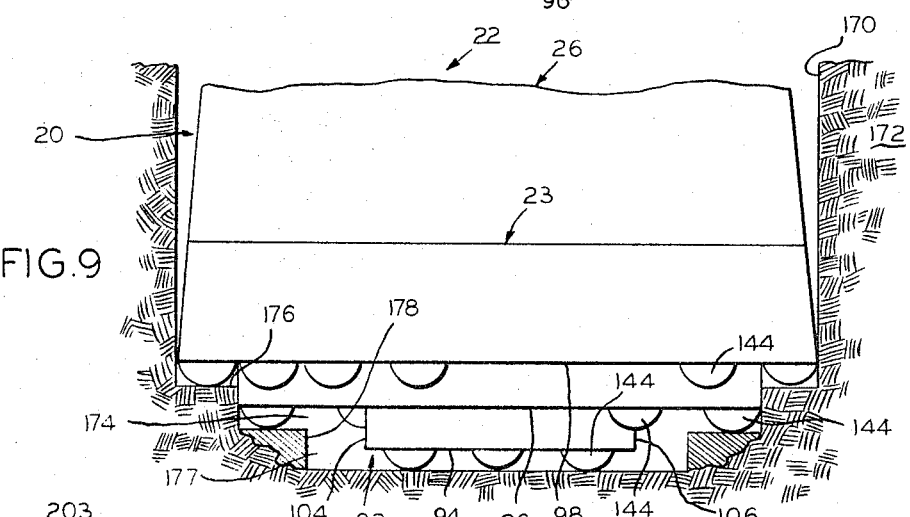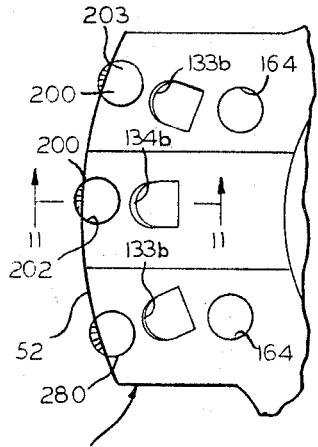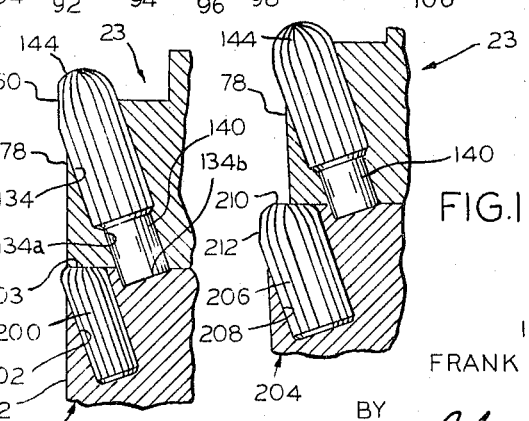
INVENTOR
FRANK E. STEBLEY
ATTORNEY

United States Patent Office 3,382,940
Patented May 14, 1968

3,382,940
PERCUSSION DRILL BIT
Frank E. Stebley, 3815 Nemesis Ave.,
Gurnee, Ill. 60031
Filed Oct. 21, 1965, Ser. No. 499,382
8 Claims. (Cl. 175—410)

ABSTRACT OF THE DISCLOSURE

A percussion drill bit includes a body and a head removably secured to the body to provide a working face on one end of the bit. The head may be secured by screw means countersunk therein and having protective plugs removably insertable above the screw means. Wear-resistant inserts such as tungsten carbide inserts are force-fitted in openings extending through the head from the working face to the body, and the inserts are rigidly supported on the body. The inserts may be supported by rigid supporting elements interposed between the inner ends of the inserts and the body. The inserts may have enlarged rounded impact ends on elongated circular body portions inserted in the insert openings, with the impact ends engaging the internal surfaces of the rims of the openings. The bit head may have a stepped surface providing an inwardly widening multilevel, e.g., trilevel, working face, insert openings extending through the head from successive levels of the working face to the body, and inserts in the openings for generating successively greater circles of revolution from successive working face levels, at least one working face level being recessed from the circle generated therefrom adjacent to an insert on an inwardly adjacent level for increased fragmentation by the adjacent insert. Bores may be provided in the body, opening to the head and to the outer periphery of the body, for loosely seating inserts in the bores for partially abutting on the head and partially projecting from the outer periphery of the body.

---

This invention relates to earth drilling tools, more particularly, to a drill bit suitable for use with percussion drilling equipment for drilling into rock formations.

Percussion drilling is widely employed for drilling blast holes in mining and quarrying. Earth boring machines are employed, and they serve to rotate and reciprocate a percussion tool to which a drill bit is attached. In the operation of an exemplary machine, the percussion tool may be rotated in one direction at about 20 r.p.m., and it may be reciprocated in short strokes of about 4–5 inches to produce about 500–800 impacts per minute.

Drilling conditions are very severe, and the drill bits must be constructed to withstand large impact forces and considerable abrasive action. A popular type of percussion drill bit is constructed of a solid steel body having a working face at one end of the bit, and a plurality of cylindrical inserts or teeth of wear-resistant material, which are force-fitted in openings in the bit body at the working face and project therefrom. The wear-resistant material preferably is tungsten carbide, also referred to as cemented tungsten carbide. The tungsten carbide material is sintered in molds and ground to diameter. The finished inserts or compacts have cylindrical body portions and hemispherical impact ends. The inserts are force-fitted into the openings in the bit body by pressing them into cylindrical openings having slightly smaller diameters, e.g., 0.001 to 0.003 inch smaller. Alternatively, the force-fitting may be accomplished by shrinking the inserts in place, e.g., cooling the inserts and/or heating the bit body for assembly, followed by return to ambient temperature to secure the inserts in place as a result of expansion and/or contraction of the members.

Drill bits having the foregoing construction are effective in fragmenting rock formations. The bits are, however, very costly, so that it is desirable to prolong their useful life as long as possible. A disadvantage of the bits is that the tungsten carbide inserts, while hard and wear-resistant, are also brittle and have poor resistance to bending. Consequently, the inserts break in use. The broken inserts cannot be replaced, and it becomes necessary eventually to discard the entire bit.

A factor that contributes to insert breakage is the difficulty of maintaining the insert mounting openings in the bit body true around their rims, for rigidly supporting the inserts at the working face. Thus, when the insert openings are drilled into the body, a bell-mouth frequently is formed around the rims of the openings at the working face. Also, a similar condition results from pressing the inserts into the openings out of proper alignment. The bell-mouth condition results in loss of holding force and support for the inserts at the critical location, where the inserts project from the surface of the supporting body.

The drill bits are constructed so that the hardness of the bit body varies, being softer adjacent the working face where the inserts are mounted, and being harder behind the inserts. There is a hardness transition zone between the two regions of the body. The hardening operation is costly, and the body is more prone to fracture at the transition zone.

Another problem encountered is that the sides of the body of the drill bit wear due to abrasion. Side wear is undesirable, in that it results in a tendency for the bit to catch in the hole as it is elevated between impacts. Also, support for the working face is lost. In the past, inserts have been mounted in the sides of the body to alleviate the problem. However, the side inserts become loose in their mounting openings and are lost repeatedly. The loss of inserts not only results in loss of protection for the sides of the bit, but loss of the inserts in the drill hole may severely damage the bit. The manner of mounting the inserts, in laterally extending positions is, furthermore, conducive to fracture of the inserts.

An object of the present invention is to provide a new and improved percussion drill bit that overcomes the problems encountered with the prior drill bits and provides advantages thereover.

A more particular object is to provide a percussion drill bit that is constructed to enable broken inserts to be replaced and also to enable replacement of the working end of the drill bit, if desired, for greatly prolonging the useful life of the bit while also serving to hold the bit gage.

Another object is to provide an insert structure that overcomes the problem of bell-mouth formation around the insert openings in the bit and furnishes increased holding force and support where the inserts project from the bit.

An additional object is to provide means for more rigidly supporting the inner ends of the inserts in the drill bits, while also avoiding the use of overly long inserts such as are more prone to fracture.

A further object is to provide a percussion drill bit structure that also serves to overcome the problems associated with providing zones of varying degrees of hardness in the bit body.

A still further object is to provide new and improved mounting structure for inserts mounted in the sides of a percussion drill bit, serving to eliminate losses of inserts and to minimize insert fracture.

Another object is to provide a percussion drill bit having a working face constructed for more effective fragmentation of a formation.

Yet another object is to provide a percussion drill bit structure which may be accurately constructed while minimizing the effect of machining errors.

These and other objects, advantages and functions of the invention will be apparent on reference to the specification and to the attached drawings illustrating preferred embodiments of the invention, wherein like parts are identified by like reference symbols in each of the views, and wherein:

FIGS. 8 and 9 are fragmentary diagrammatic views of the bit in the process of drilling a hole in a formation, the bit being illustrated in the respective views in different rotational positions;

FIG. 10 is a fragmentary top plan view of another embodiment of the bit body, illustrating the additional provision of structure for mounting inserts on the sides of the body;

FIG. 11 is a fragmentary sectional view of the drill bit embodiment of FIG. 10, taken sustantially on line 11—11 thereof; and FIG. 12 is a fragmentary view similar to FIG. 11 but illustrating a further embodiment of the drill bit.

Figures 1, 2:
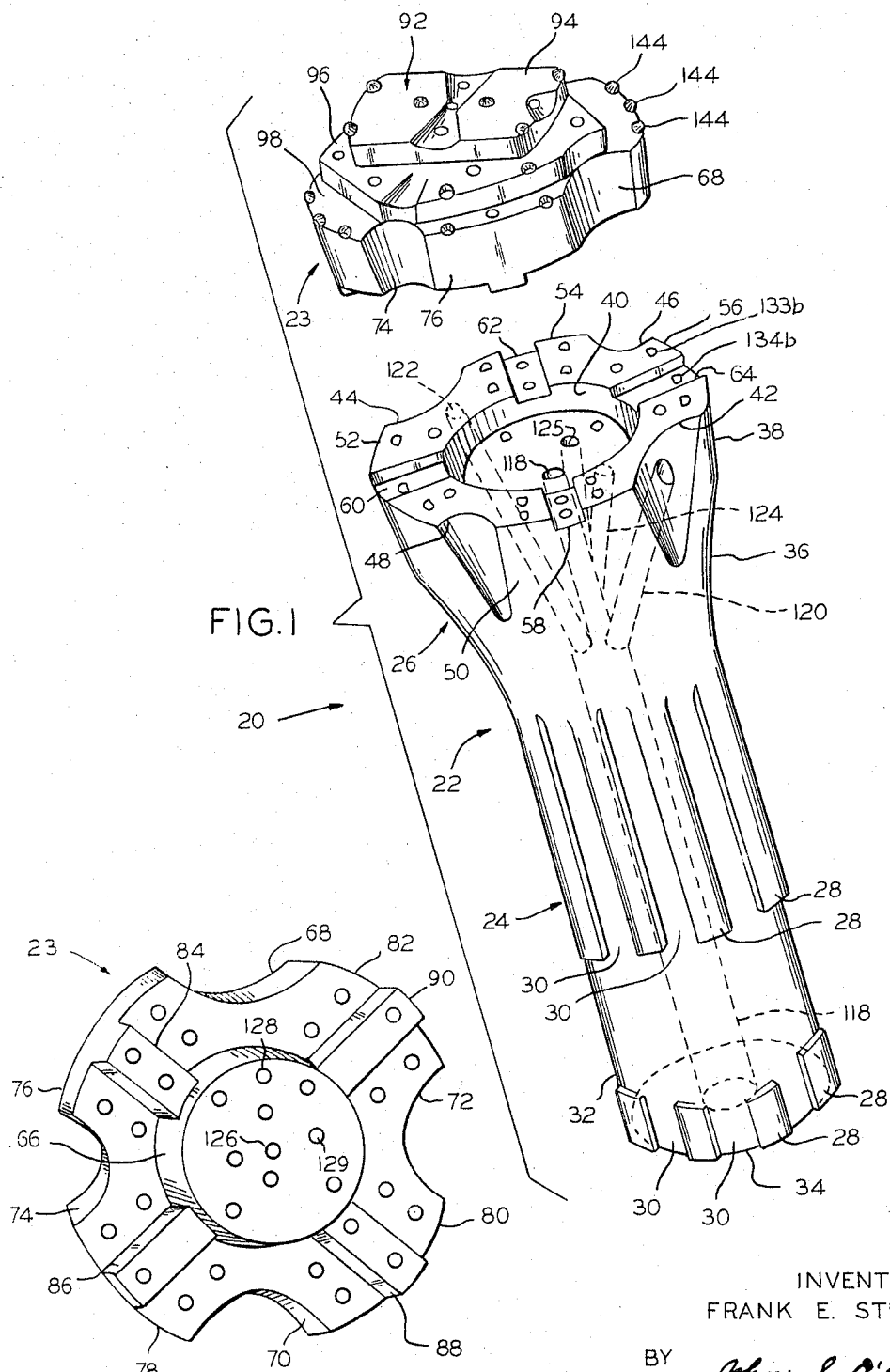
FIG. 1 is an exploded perspective view of one embodiment of a rotary-percussion drill bit of the invention.
FIG. 2 is a perspective view of the head of the bit, illustrating the underside thereof.

The invention provides a percussion drill bit comprising a bit body for receiving and transmitting impact forces from a percussion tool, a head mountable on the body to provide a working face on one end of the bit, means forming a plurality of openings extending through the head from the working face to the body, a plurality of solid wear-resistant inserts force-fitted in the openings and projecting from the working face, means rigidly supporting the inner ends of the inserts on the body, and means for removably or detachably securing the head on the body. In a preferred structure, the securing means comprise screw means countersunk in the head and spaced beneath the outer surface thereof, and protective plugs are removably inserted in the spaces above the screw means.

In another preferred embodiment, also more broadly useful, rigid supporting elements are interposed between the inner ends of at least part of the inserts and the body. In another broadly applicable embodiment, the inserts have elongated circular body portions inserted in circular openings, and enlarged rounded impact ends projecting from the working face and engaging the internal surfaces of the rims of the openings for being supported thereby.

A further preferred broadly applicable construction includes a stepped surface providing an inwardly widening multilevel working face on the end of the bit, means forming a plurality of openings extending inwardly from successive levels of the working face, and a plurality of inserts mounted in the openings and projecting from the working face for generating successively greater circles of revolution from successive working face levels, at least one working face level being recessed from the circle generated therefrom adjacent to an insert on an inwardly adjacent level for increased fragmentation by the adjacent insert.

Another broadly applicable feature includes means forming a plurality of inclined bores in the bit body opening to the head and to the outer periphery of the body, and a plurality of inserts loosely seated in the bores for partially abutting on the head and partially projecting from the outer periphery of the body.

Referring to the drawings, particularly FIGS. 1–4, a preferred rotary-percussion drill bit 20 according to the invention includes a bit body 22 and a head 23 removably mountable on the body. The body is constructed of a solid block of steel, heat treated to suitable hardness. The head likewise is constructed of a solid block of steel, heat treated to a lesser degree of hardness. The body and the head together constitute a substantially solid block, drilled to provide internal air-water passageways, insert mounting openings, and screw openings, and milled to provide external air-water passageways, as set forth in more detail hereinafter.

The bit body 22 includes a shank 24 and an integral enlarged base 26. The shank is generally cylindrical. It is provided with a plurality of splines 28 alternating with grooves 30 therearound, parallel to the longitudinal axis of the shank, and interrupted by a wide circumferential groove 32. The drill bit 20 is attached to a percussion or impact tool of a standard type (not shown) by the shank 24, with the splines 28 and grooves 30 engaging complementary grooves and splines in the lower end of the tool and a split ring (not shown) inserted in the circumferential groove 32 to retain the bit on the tool. The spline and groove structure serves to transmit rotational forces from the tool to the bit. A flat transverse end surface 34 on the shank constitutes an anvil receiving the impact forces imparted by the tool. The rotational and impact forces are transmitted from the shank to the integral base 26, and the base in turn transmits such forces to the head 23 mounted thereon.

The base 26 of the bit body 22 includes an inner frusto-conical section 36 joined to the shank 24, and an outer frusto-conical section 38 joined to the inner section. The inner section 36 is inclined at a representative angle of about 18-20° to the longitudinal axis of the shank. The outer section 38 is inclined at about 5° C. to the axis, as represented by the angle a of FIG. 4.

A cylindrical recess 40 coaxial with the longitudinal axis of the bit 20 is provided in the outer section 38 of the base of the bit body. Four external coniform air-water passageways are milled on the base with their centers disposed around the bit axis at 90° angles to each other. The external passageways include two diametrically opposed relatively wide passageways 42 and 44, and two diametrically opposed relatively narrow passageways 46 and 48. Wings 50, 52, 54 and 56 remain on the body between the passageways. Radial lug grooves 58, 60, 62 and 64 are milled centrally in the faces of the respective wings.

Figure 3:
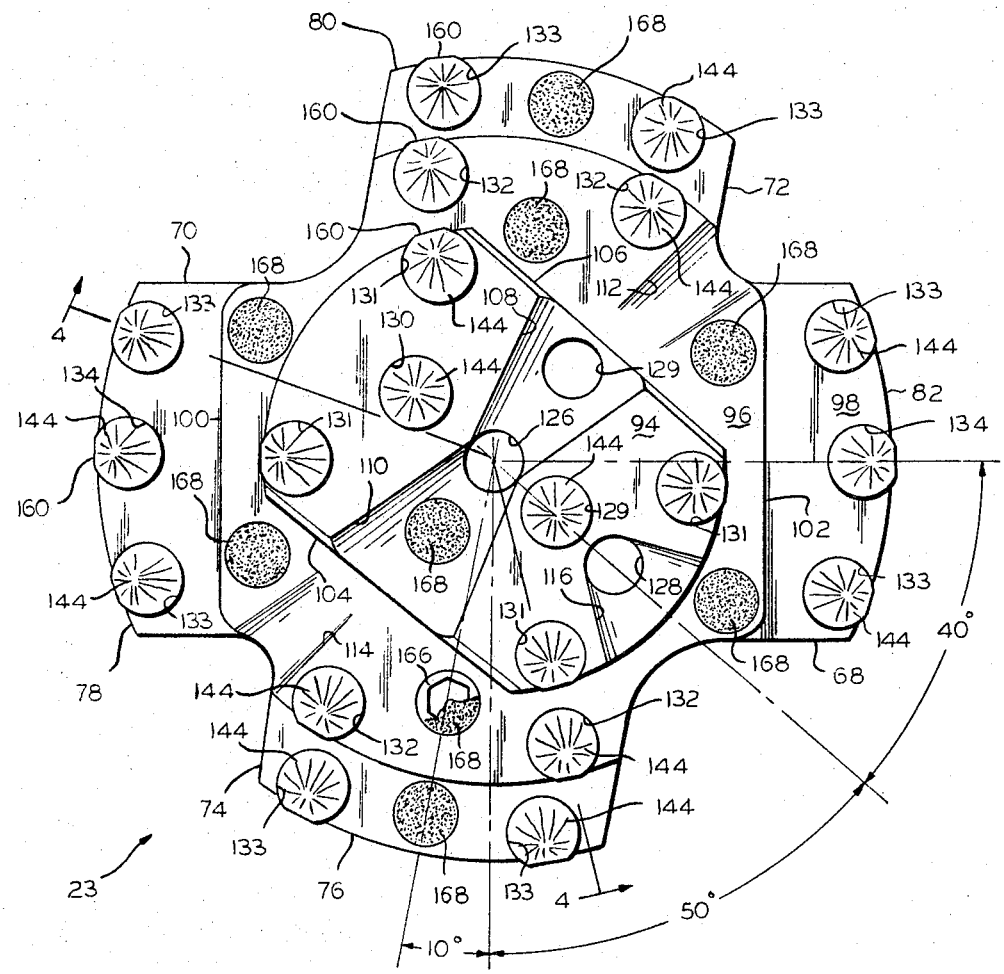
FIG. 3 is an enlarged top plan view of the head.

The head 23 is generally frusto-conical. It includes a central cylindrical projection 66 on its underside which fits closely within the recess 40 of the base 26 of the bit body 22. Four external air-water passageways 68, 70, 72 and 74 are milled on the head at 90° angles around its axis, and they register with and constitute extensions of the external passageways on the bit body. Two diametrically opposed wide passageways 68 and 70 on the head register with the wide passageways 42 and 44, respectively, on the bit body. Two narrow passageways 72 and 74 on the head register with the narrow passageways 46 and 48, respectively, on the bit body. Wings 76, 78, 80 and 82 remain on the head between the external passageways, and they align with the wings 50, 52, 54 and 56, respectively, on the bit body. FIG. 3 illustrates a preferred angular relationship of the wings, wherein two opposed wings 76 and 80 are centered at 80° and 100° from the respective adjacent wings 78 and 82. Radial lugs 84, 86, 88 and 90 are formed on the undersides of the head wings, and they closely fit in the lug grooves 58, 60, 62 and 64, respectively, on the bit body.

The head 23 is constructed with a stepped surface providing an inwardly widening trilevel working face 92 thereon at the working end of the bit 20. The head includes an outer or first working level 94, an intermediate or second level 96, and an inner or third level 98. The several levels are formed initially as concentric cylindrical sections of increasing diameter. The outer and intermediate levels 94 and 96 are milled to provide diametrically opposed recessed flat sides on each level, and the intermediate level 96 also is milled in forming the air-water passageways 68, 70, 72 and 74. Thus, as seen most clearly in FIG. 3, the intermediate level 96 has opposite recessed sides 100 and 102, and the outer level 94 has opposite recessed and chamfered sides 104 and 106. In the illustrative structure, the recessed sides 100 and 102 of the intermediate level extend across the wings 78 and 82. The recessed sides 104 and 106 of the outer level extend at angles of 50° to the recessed sides of the intermediate level.

The face of the outer level 94 is milled to provide coniform grooves 108 and 110 extending from its center to the recessed sides. The face of the intermediate level 96 is milled to provide similar grooves 112 and 114 in line with the outer level grooves and extending to the narrow air-water passageways 72 and 74. The face of the outer level also is milled to provide a similar groove 116 at one end, extending towards a wide air-water passageway 68.

Figure 4:
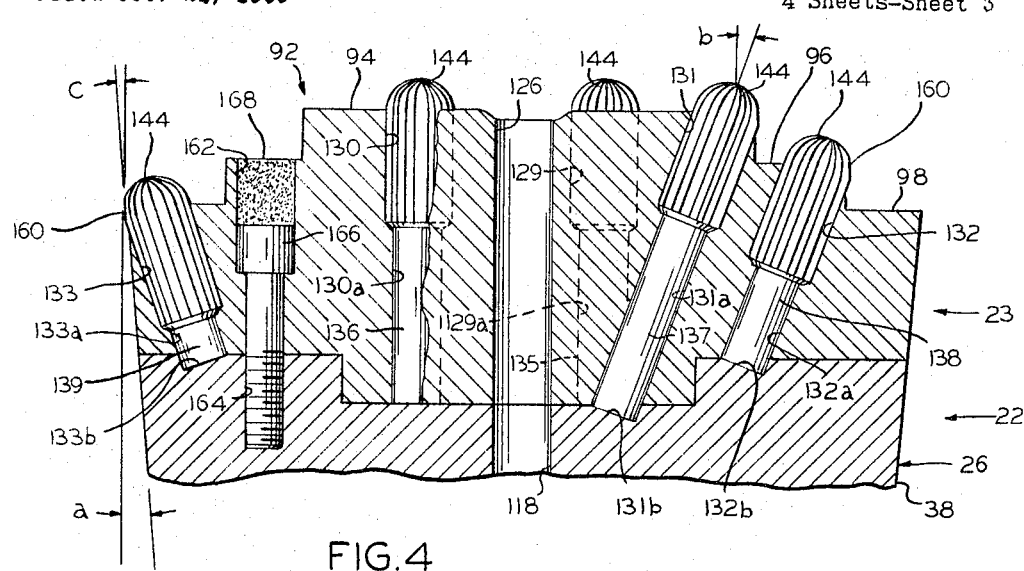
FIG. 4 is a fragmentary sectional view of the drill bit, taken substantially on lines 4—4 of FIG. 3.

Referring to FIG. 1, a central cylindrical air-water passageway 118 extends axially in the bit body 22, from the impact end 34 of the shank to the recess 40 in the base. Branch passageways 120 and 122 extend from the central passageway to the wide external passageways 42 and 44, respectively. Additional branch passageways 124 and 125 extend from the central passageway to the recess 40. Referring also to FIGS. 2-4, the central passageway 118 registers with a cylindrical passageway 126 extending axially through the head 23. One branch passageway 124 registers with a cylindrical passageway 128 extending through the head to the end groove 116 in the outer level 94. Another branch passageway 125 registers with a cylindrical passageway 129 extending through the head to the side groove 108 in the outer level. The passageways serve to convey air and/or water to the working face 92. Rock chips and other loose material around the working face are forced out of the bottom of the drill hole, and are conducted away through the external passageways 68, 70, 72 and 74 and around the shank thereafter.

A number of cylindrical insert openings are provided in the head 23, and they extend inwardly from the working face 92 towards the bit body 22. In the illustrative embodiment, twenty insert openings are provided, and they are arranged generally in concentric circles around the axis of the head. One insert opening 129 extends from the outer level 94 near the axis and parallel thereto. A second opening 130 extends from the outer level 94 at a greater radial distance from the axis and parallel thereto. Four insert openings 131 extend from the outer level 94 adjacent the corners thereof and at equal radial distances from the axis. These openings are outwardly inclined in the radial direction at preferred angles b (FIG. 4) to the head axis of about 20-25°. They open to the face and to the upper portions of the sides of the outer level, at the junctures of the face and sides.

Four insert openings 132 extend from the intermediate level 96 in the curved segments thereof on the wings 76 and 80. These openings likewise are inclined outwardly in the radial direction at angles of about 20-25°, and they open to the face and to the upper portions of the adjacent sides of the intermediate level. Eight insert openings 133 extend from the inner level 98 adjacent the corners of the wings 76, 78, 80 and 82, there being two such openings in each wing. Two insert openings 134 extend from the centers of two opposite wings 78 and 82. The openings in the inner level likewise are outwardly inclined in the radial direction at angles of about 20-25°, and they open to the face and to the upper portions of the adjacent sides of the inner level. The axially extending insert openings 129 and 130 extend into the head for equal distances. The inclined openings 131-134 extend into the head for equal distances, corresponding to the axially extending openings but for the differences in inclination.

As illustrated in FIGS. 4 and 11, cylindrical pin openings 129a-134a are provided in the head, and they constitute extensions of the respective insert openings 129-134. The pin openings extend from the underside of the head to the insert openings, coaxially therewith. The diameters of the pin openings may be the same as or different from the diameters of the insert openings, so long as adequate insert support and access to the inserts are provided, as subsequently described. In the illustrative embodiments, the pin openings are smaller than the insert openings so that they are better accommodated in the head volume. Where the inclined pin openings meet the outer base section 38 of the bit body 22, the base section is milled to provide inclined grooves 131b-134b (see also FIG. 10), which with the pin openings form cylindrical openings in the bit.

Rigid supporting pins or elements 135-140 in the form of solid cylindrical steel pins are loosely inserted in the pin openings 129a-134a, respectively. The pins are seated on the outer body section 38, with the pins 131-134 in the inclined openings seated on the bottoms of the grooves 131b-134b. The pins preferably have a hardness at least equal to the hardness of the bit body 22, especially the outer section 38. The several pins have the same diameter, and their lengths correspond to the various lengths of the pin openings. The pins extend at least to the insert openings 129-134, and they may extend into the insert openings.

Figure 5:
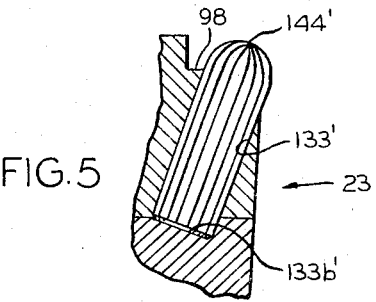
FIG. 5 is a fragmentary sectional view of the bit, illustrating an alternative method of mounting an insert.

In an alternative embodiment, illustrated in FIG. 5, insert openings 133' in the inner level 98 extend to the outer body section 38, where inclined grooves 133b' are milled in the body section. This construction may be employed for heads of smaller sizes or where the thickness of the head is not too great, and the rigid supporting pins may be omitted.

Figures 6, 7:
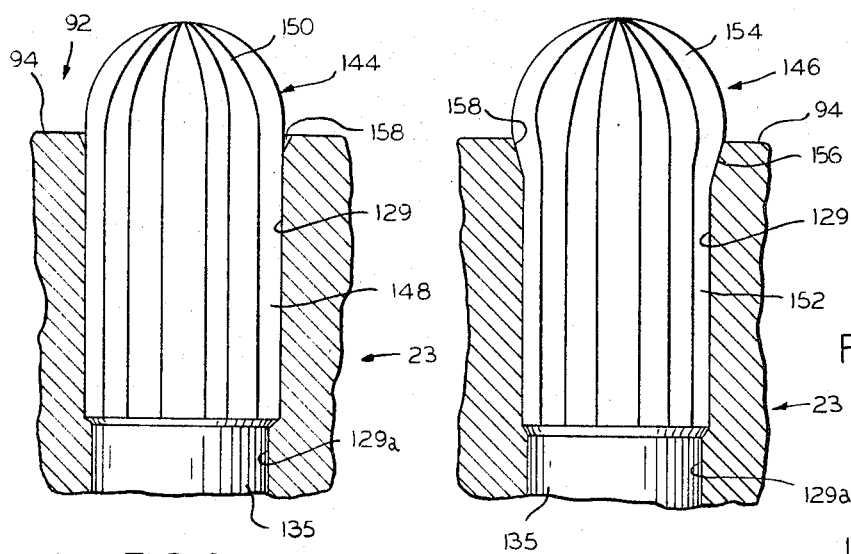
FIG. 6 is a further enlarged fragmentary view of the head of the bit, illustrating an insert mounted therein and a mounting problem which is encountered.
FIG. 7 is a view similar to FIG. 6 but showing a novel insert structure which overcomes the problem illustrated in FIG. 6.

Conventional tungsten carbide inserts or teeth, such as the insert 144 illustrated in FIG. 6, may be mounted in the insert openings 129-134 in the head of the drill bit to project therefrom. The insert 144 includes a cylindrical body portion 148 and a hemispherical impact end or head 150 of the same diameter. Such insert is illustrated in all of the views except FIG. 7. Alternatively, in a further preferred embodiment of the invention, inserts having the structure of the insert 146 illustrated in FIG. 7 may be employed. The insert 146 has a cylindrical body portion 152 and an enlarged or larger diameter generally spheroidal impact end 154. The impact end includes a conically tapering transition section 156 integrally joined to the body portion.

It is preferred that inserts 144 or 146 of the same size be employed throughout the head, and the insert openings are drilled to corresponding depths, as described above. The inserts are force-fitted into the several insert openings, as by pressing the inserts thereinto, so that their inner ends are seated on the supporting pins 135-140 for rigid support thereby on the body 22, with their impact ends projecting from the working face 92. When the structure of FIG. 5 is employed, inserts 144' are force fitted in the insert openings 133', and the inserts are seated on the body 22, in the grooves 133b', for rigid support thereon.

It frequently happens that in drilling or reaming the insert openings, or in pressing the inserts into the openings, bell-mouths are formed around the rim of the openings, or other irregularities in the openings occur, as illustrated by the bell-mouth 158 around the insert opening 129 in FIGS. 6 and 7. Such conditions remove the support for the insert at the critical point where the insert projects from the working face 92 of the head 23. Consequently, the insert is much more prone to fracture, especially inasmuch as there is more room for transverse movement of the insert at the outer end. Numerous insert fractures have been traced to this condition, the fractures frequently occurring within the insert openings such as 129, near the longitudinal center of the insert.

The insert 146 of FIG. 7 overcomes the foregoing problem of insert fracture, by a simple yet effective construction. The insert is force-fitted in the opening 129 with the impact end 154 engaging the internal surface of the bell-mouth rim 158 of the opening for being supported thereby. In particular, the transition section 156 of the end is forced against the bell-mouth. The structure also is useful with openings not having the bell-mouth problem, inasmuch as the insert is wedged in the mouths of such openings and is more rigidly supported.

As illustrated in FIGS. 3 and 4, the inserts 144, or 146, are in one of two forms when the drill bit is finished. Two inserts are mounted in the openings 129 and 130 in parallel to the axis of the head near the center thereof, and they remain in their original form. The remaining inserts are inclined with respect to the axis of the head, and they project longitudinally and transversely from the working face, from both the end and side surfaces of the several levels thereof. Flats 160 are ground on the outer sides of the impact ends of these inserts, at preferred angles $c$ (FIG. 4) from the axis of the head of about 3°. The increased surface area provided by these flats on the outer sides of the inserts serves to better hold the gage of the bit.

Nine countersunk screw openings extend from the working face 92 of the head 23 to the outer section 38 of the bit body, as illustrated by one screw opening 162 in FIG. 4. The openings register with corresponding tapped openings 164 in the body section. The head is removably secured on the bit body by Allen head cap screws 166 inserted in the openings. The screw heads are spaced beneath the working face, and protective plugs 168 of rubber or other suitable material are removably inserted in the spaces above the screw heads. As seen in FIG. 3, where the protective plugs 168 are visible, two screws are provided at each of the wings 76, 78, 80 and 82, and one screw is provided near the center of the head. The latter screw is located in the area of the outer level 94, six screws are located in the area of the intermediate level 96, and two screws are located in the area of the inner level 98. The plugs 168 serve to protect the screw heads, so that after removing the plugs, the screws are readily removed to separate the head from the body.

FIGS. 8 and 9 illustrate the manner in which the drill bit 20 operates in drilling a hole 170 in a rock formation 172. The drill bit is shown in these views as rotated about 50° from one view to the other. The bit is reciprocated to cause the inserts 144 to fragment the formation. The impact force is transmitted from a percussion tool to the bit body 22 as described above. The force is transmitted from the base 26 of the body to the supporting pins 135–140 (FIGS. 4 and 11), and from the pins to the inserts. Alternatively, the force may be transmitted from the body directly to some of the inserts, as illustrated in FIG. 5.

The inserts 144 are rigidly supported on the hard body outer section 38 by the pins 135–140 of at least equal hardness. This structure minimizes insert vibration due to impacts and, consequently, loosening of the inserts in their openings due to vibration is avoided. The head 23 may be treated to provide a hardness suitable for drilling the insert openings and for mounting the inserts, and it is not necessary to provide a hardness transition zone from the head to the body. Consequently, the tendency of the bit to fracture in such zone is eliminated. The support provided by the pins also enables the inserts to be manufactured in lengths which are less prone to fracture.

The bit has a counterbore action, with the outer level 94 breaking up the central area at the bottom of the hole, and the intermediate and inner levels 96 and 98 breaking up successively wider areas therearound. Air and/or water is supplied through the central passageway 118 (FIG. 1) in the bit, and from there to the working face 92, to clear loose material away from the face, conducting it up through the external passageways 42, 68; 44, 70; 46, 72; and 48, 74 (FIGS. 1 and 3). The flow is assisted by the grooves 108, 110, 112, 114 and 116 in the working face.

FIGS. 8 and 9 illustrate the manner in which the recessed sides 100 and 102 of the intermediate level 96, and the recessed sides 104 and 106 of the outer level 94 cooperate with other structure to provide better fragmentation. Thus, it will be seen on reference to FIG. 9 that the inserts 144 on the intermediate level 96 fragment an area 174 as the bit is rotated. As also seen in this view, the extended curved sides of the intermediate level tend to support an adjacent corner or ledge 176 of the formation. As seen in FIG. 8, this corner is spaced from the recessed sides 100 and 102 of the intermediate level, with the support provided by the intermediate level removed. Consequently, the inserts 144 on the inner level 98, particularly those on the wings 78 and 82 (FIG. 3) adjacent to the recessed sides, are enabled to break off the corner 176 more readily, in a manner such as illustrated by fracture lines in FIG. 8.

The inserts 144 on the outer level 94 clear an opening 177 at the bottom of the hole, as seen in FIG. 8. A second corner or ledge 178 of the formation is supported by the extended curved sides of the outer level. As illustrated in FIG. 9, the recessed sides 104 and 106 of the outer level 94 are spaced from the second corner, so that there is no support therefor. The intermediate level inserts 144 adjacent to the recessed sides of the outer level are enabled to break off the corner 178, as illustrated by fracture lines in FIG. 9. Referring to FIG. 3, the particular inserts are two inserts on the intermediate level 96 respectively adjacent to the narrow external passageways 72 and 74.

When the inserts 144 become excessively worn, or if insert breakage becomes excessive, the head 23 is removed from the bit body 22, by removing the plugs 168 and the screws 166. The loose fitting supporting pins 135–140 are withdrawn from the underside of the head, and the worn or broken inserts are punched or pressed out of the insert openings 129–134 from the underside of the head. Thereafter, the head is mounted on the body and secured by the screws 166. The pins are replaced in the pin openings, and new inserts are force-fitted in the insert openings. The protruding sides of the inclined inserts are ground to provide the flats 160. The bit then is ready for reuse. Should the head 23 become excessively worn or damaged, it may be replaced by a new head while reusing the body 22.

In order to reduce wear on the sides of the bit body 22, additional inserts 200 similar to the head inserts 144 may be mounted in the body, as illustrated in FIGS. 10 and 11. The bit structure embodying a removable head 23 enables the body inserts to be mounted easily and held securely while the inserts are rigidly supported. Insert bores or openings 202 are provided in the body wings such as 52, around the periphery of the base 26. The bores are inclined radially at angles similar to the inclined insert openings in the head, i.e., at about 20–50° to the axis of the body. The bores open to or terminate beneath the head 23 and also open to the outer periphery of the base. The body inserts are ground flush with the end or face surfaces of the base to provide flats 203, so that they are held in their bores by the head secured to the bit body. The inserts project from the sides of the base, where they serve to resist wear. The inserts are loosely seated in the bores, so that they are readily removed and replaced. It is not necessary to force-fit the inserts in the bores, so that the full hardness of the body may be maintained to provide maximum support for the insert. The body inserts are not prone to fracture as are transversely extending body inserts, and they cannot fall out of their bores.

FIG. 12 illustrates a similar structure which provides both body wear resistance and additional cutting or reaming action. In this structure, the base 204 of the bit body has a greater diameter than the head 23. Body inserts 206 are mounted in bore 208 in the base, similarly to the structure of FIGS. 10 and 11. In this case, the inserts hay have a greater diameter, so that they project beyond the periphery of the base while abutting on the underside of the head at a ground flat surface 210 thereon flush with the end surface of the base. Flats 212 are ground on the projecting sides of the body inserts, similarly to the flats 160 on the head inserts 144.

The invention is illustrated as it is applied to a 6 inch diameter drill bit 20. The inserts preferably have elongated circular body portions and rounded impact ends. More preferably, the body portions are cylindrical and the impact ends are spherical, as illustrated. Alternatively, the body portions may taper conically, although this is less desirable for manufacturing purposes.

The inserts 144 preferably have a diameter of about 9/16 inch and a length of about 1⅛ to 1 3/16 inches. The dimensions of the improved inserts 146 are the same, except that the impact end 154 preferably has a diameter about 0.03 inch greater than the diameter of the body portion 152.

The insert openings 129–134 in the head 23 preferably are about 0.0025 to 0.003 inch smaller in diameter than the diameter of the inserts 144 and 146 press-fitted therein. The inserts project about 9/32 inch from the working face 92, and they project from the sides of the bevels 94, 96, and 98 about 1/16 inch before grinding. The flats 160 are ground to about 3/16 inch width in providing the drill gage. The diameter of the support pins 135–140 preferably is about 7/16–½ inch. The pins preferably extend slightly into the insert openings 129–134, up to about 0.03 inch. It will be understood that appropriate variations in these and other dimensions, spacings, arrangements, number of inserts, and so forth may be made in drill bits of the same and other sizes.

In manufacturing the drill bit 20, the body 22 may be constructed in the forms illustrated in the several views prior to hardening. In this connection, the insert bores 202 and 208 (FIGS. 11 and 12) may be provided in the body prior to hardening without need for reaming after hardening. The body is hardened by heat treatment in the usual manner to a Rockwell C hardness of about 56. The end surfaces of the base 26 that mate with the head 23 are finish machined after hardening. The insert supporting pins 135–140 are manufactured with a similar hardness.

The grooves, screw openings, and air passages are provided in the head 23 before hardening. Also, the pin openings 129a–134a are drilled in the head, and they are extended through the head to serve as pilot holes for subsequently drilling the insert openings 129–134. The head then is hardened to a Rockwell C hardness of about 35–38. The insert opening 129–134 are formed by a carbide mill or drill with attached pilot inserted in the reduced diameter pin openings. The insert openings are more accurately formed in this manner. The depth of the insert openings may be greater than necessary, inasmuch as the supporting pins 135–140 of predetermined length gage the height of the inserts, and the pins may extend into the insert openings. The under surfaces of the head are finsh machined for mating with the base 26 of the bit body.

The projections 66 on the head is inserted in the base recess 40, and the lugs 84, 86, 88 and 90 on the head are received in the lug grooves 58, 60, 62 and 64 in the base, in both cases with a slip-fit. The head and the body are joined by the screws 166, and the plugs 168 are inserted over the screw heads. In this manner, the head is securely attached to the bit body, and lateral and rotational displacement of the head are prevented. The supporting pins 135–140 are inserted in their openings from the face of the head, and the inserts 144 are pressed in the insert openings against the outer ends of the supporting pins. The flats 160 are ground on the inclined inserts, and for this purpose, the head may be removed from the body and the pins subsequently reinserted from the underside of the head. The drill bit is ready for use after grinding the inserts. Extra heads may be constructed in the same manner and kept on hand for quick replacement when the need arises.

The invention thus provides a durable percussion drill bit that is very well adapted for readily replacing worn or damaged inserts and other components. Also, structure is provided for reducing wear, breakage, and loss of inserts. The new head structure reduces the work load on the outer inserts, and better fragmentation is accomplished.

While several preferred embodiments of the invention have been illustrated and described, it will be apparent that various changes and modifications may be made therein within the spirit and scope of the invention. It will be apparent also that various features of the invention may be employed in other styles and types of drill bits. It is intended that all such changes, modifications, and variations be included within the scope of the appended claims.

I claim:

1. A percussion drill bit which comprises a bit body for receiving and transmitting impact forces from a percussion tool,
    a head mountable on said body to provide a working face on one end of the bit,
    means forming a plurality of substantially cylindrical openings extending through said head from said working face to said body,
    a plurality of solid wear-resistant tungsten carbide inserts having substantially cylindrical body portions force-fitted in said openings and said inserts projecting from said working face,
    means for rigidly supporting the inner ends of said inserts on said body including elongated substantially cylindrical steel supporting elements having a hardness at least equal to the hardness of said body interposed between the inner ends of at least part of said inserts and said body,
    and means for removably securing said head on said body.

2. A percussion drill bit which comprises a bit body for receiving and transmitting impact forces from a percussion tool,
    a head mountable on said body to provide a working face on one end of the bit,
    said body and said head together comprising a substantially solid block,
    means forming a plurality of air-water passageways in said block,
    means forming a plurality of substantially cylindrical openings extending through said head from said working face to said body,
    a plurality of solid wear-resistant tungsten carbide inserts having substantially cylindrical body portions force-fitted in said openings and said inserts projecting from said working face,
    means for rigidly supporting the inner ends of said inserts on said body including elongated substantially cylindrical steel supporting elements having a hardness at least equal to the hardness of said body interposed between the inner ends of at least part of said inserts and said body,
    and screw means extending through said head into said body for removably securing said head on said body.

3. A rotary-percussion drill bit which comprises a bit body for receiving and transmitting rotational and impact forces from a percussion tool, a head having a stepped surface mountable on said body to provide an inwardly widening multilevel working face on one end of the bit, means forming a plurality of openings extending through said head from successive levels of said working face to said body, a plurality of solid wear-resistant inserts force-fitted in said openings and projecting from said working face for generating successively greater circles of revolution from successive working face levels, at least one working face level being recessed from the circle generated therefrom adjacent to an insert on an inwardly adjacent level for increased fragmentation by said adjacent insert, means for rigidly supporting the inner ends of said inserts on said body, and means for removably securing said head on said body.

4. A drill bit as defined in claim 3 wherein said inserts comprise tungsten carbide compacts, and said insert supporting means include steel supporting elements interposed between the inner ends of at least part of said inserts and said body.

5. A rotary-percussion drill bit which comprises a bit body for receiving and transmitting rotational and impact forces from a percussion tool, a head having a stepped surface mountable on said body to provide an inwardly widening trilevel working face on one end of the bit, means forming a plurality of openings extending through said head from successive levels of said working face to said body, a plurality of solid wear-resistant inserts force-fitted in said openings and projecting from said working face for generating successively greater circles of revolution from successive working face levels, the outer and intermediate working face levels being recessed from the respective circles generated therefrom on opposite sides of each level adjacent to inserts on the intermediate and inner working face levels respectively for increased fragmentation by said adjacent inserts, means for rigidly supporting the inner ends of said inserts on said body, and means for removably securing said head on said body.

6. In a rotary-percussion drill bit, a stepped surface on one end of the bit providing an inwardly widening multilevel working face thereon, means forming a plurality of openings extending inwardly from successive levels of said working face, and a plurality of solid wear-resistant inserts mounted in said openings and projecting from said working face for generating successively greater circles of revolution from successive working face levels, at least one working face level being recessed from the circle generated therefrom adjacent to an insert on an inwardly adjacent level for increased fragmentation by said adjacent insert.

7. A drill bit as defined in claim 6 having a trilevel working face and wherein the outer and intermediate working face levels are recessed from the respective circles generated therefrom on opposite sides of each level adjacent to inserts on the intermediate and inner working face levels respectively.

8. A drill bit as defined in claim 7 wherein said inserts comprise tungsten carbide compacts force-fitted in said openings.

References Cited

UNITED STATES PATENTS

| | | | |
|---|---|---|---|
| 1,063,982 | 6/1913 | Larnce | 175—412 |
| 1,388,490 | 8/1921 | Suman | 175—413 X |
| 2,097,030 | 10/1937 | Killgore | 175—410 |
| 2,326,908 | 8/1943 | Williams | 175—412 X |
| 2,506,388 | 5/1950 | Ross | 175—410 X |
| 2,604,305 | 7/1952 | Livingstone | 175—410 X |
| 2,687,875 | 8/1954 | Morlan | 175—374 |
| 2,689,109 | 9/1954 | Curtis | 175—410 |
| 2,750,156 | 6/1956 | Coats | 175—413 X |
| 3,139,149 | 6/1964 | Dionisotti | 175—413 |
| 3,163,245 | 12/1964 | York | 175—410 X |

NILE C. BYERS, Jr., *Primary Examiner.*

CHARLES E. O'CONNELL, *Examiner.*